Oct. 18, 1927.  
C. H. SHROPE  
1,646,222  
NUT CASTELLATING MACHINE  
Filed Nov. 13, 1925  
6 Sheets-Sheet 4

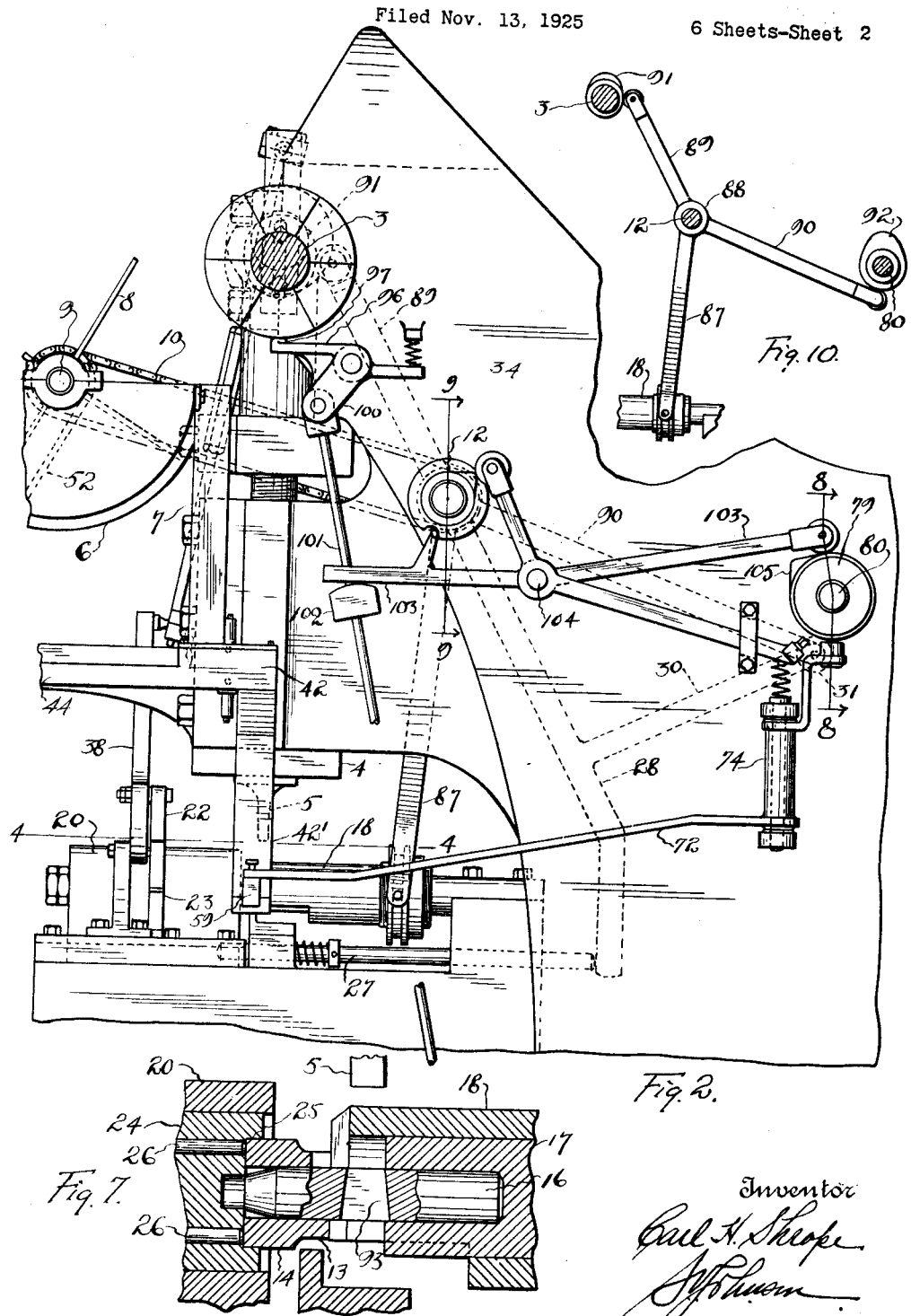

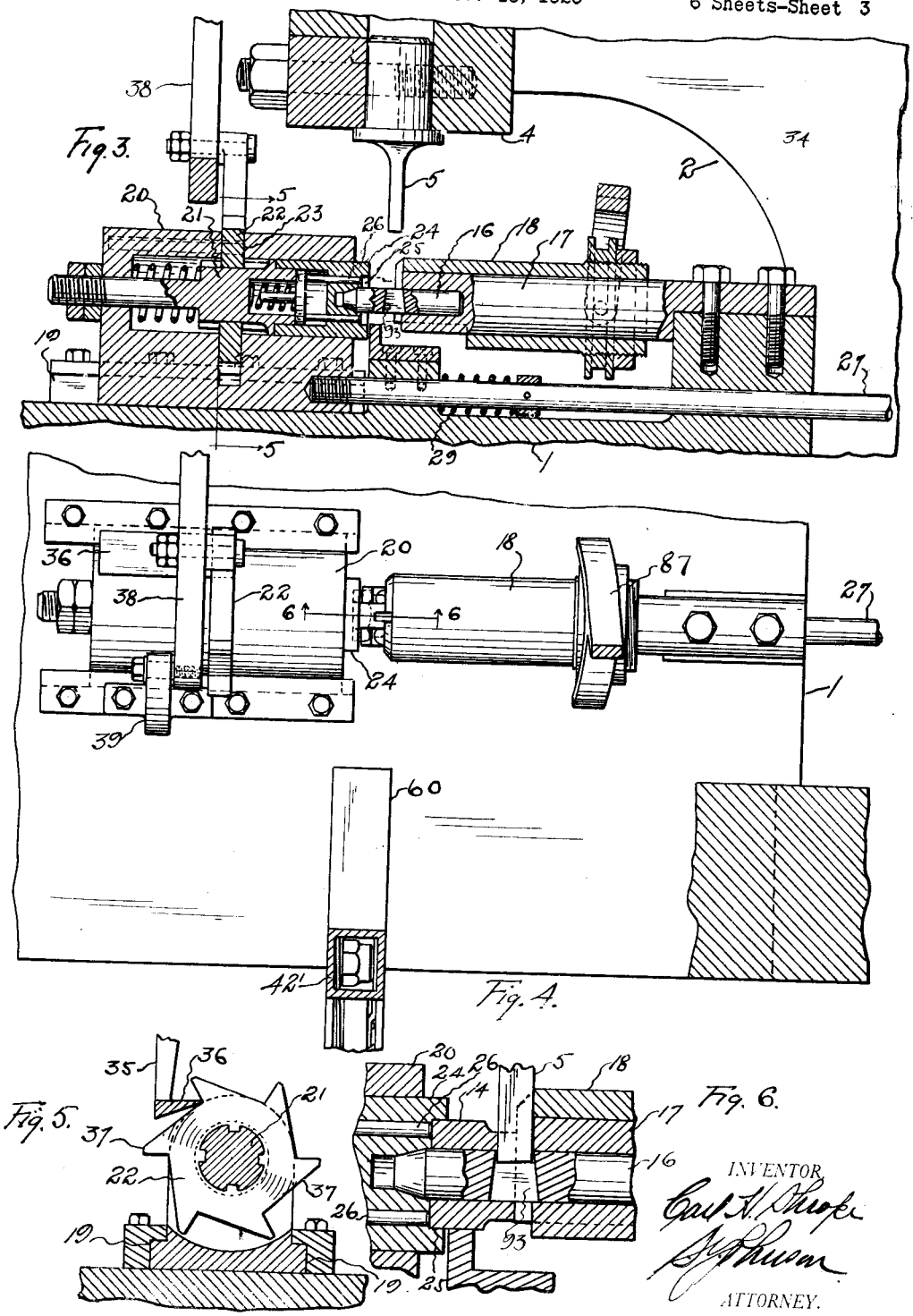

INVENTOR.  
ATTORNEY.

Oct. 18, 1927. 1,646,222
C. H. SHROPE
NUT CASTELLATING MACHINE
Filed Nov. 13, 1925    6 Sheets-Sheet 5
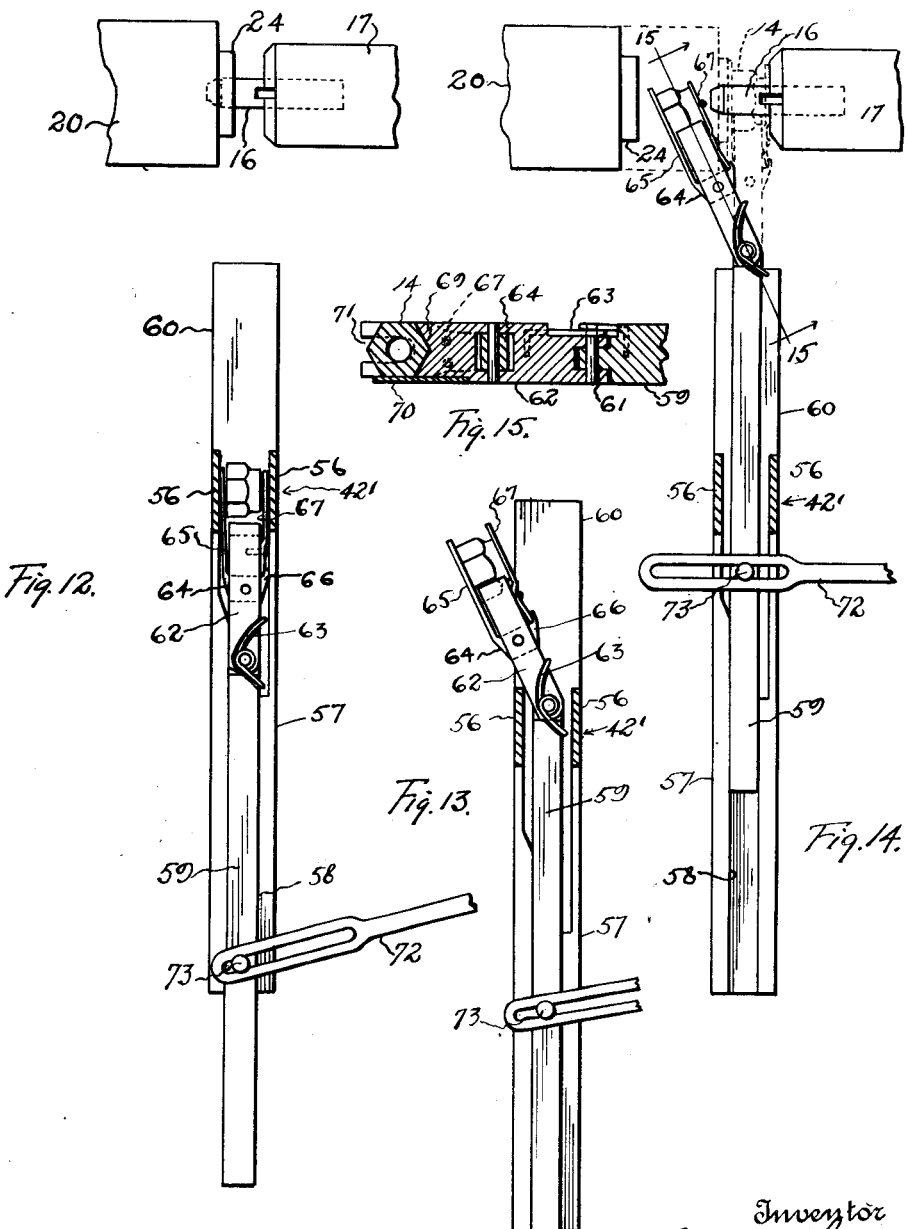

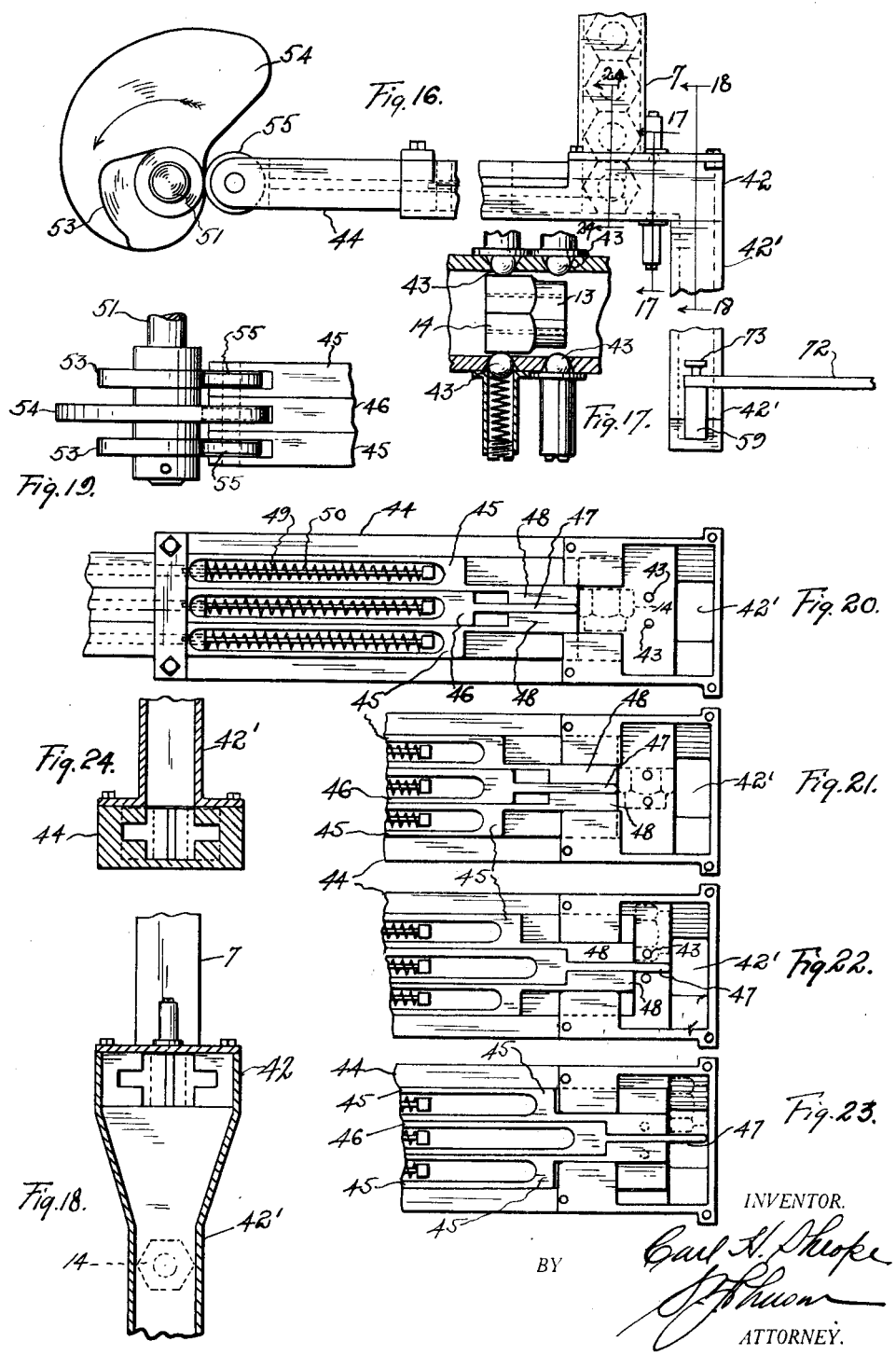

Patented Oct. 18, 1927.

1,646,222

UNITED STATES PATENT OFFICE.

CARL H. SHROPE, OF COLUMBUS, OHIO.

NUT-CASTELLATING MACHINE.

Application filed November 13, 1925. Serial No. 68,887.

The present invention is directed to improvements in machines for castellating nuts.

The primary object of the invention is to provide a device of this character so constructed that the nuts to be castellated are fed automatically to the punching element.

A further object of the invention is to provide a machine of this character so constructed that the nuts after leaving the hopper will be so manipulated that the crowns thereof will be acted upon in order that they will be properly positioned for placement directly under the punching element regardless of the position the crowns assume after leaving the hopper.

With these and other objects in view, this invention resides in the novel features of construction, formation, combination and arrangement of parts to be hereinafter more fully described, claimed and illustrated in the accompanying drawings, in which:—

Figure 2 is a side elevation of the device showing the nut hopper in place.

Figure 3 is a sectional view on line 3—3 of Figure 1.

Figure 4 is a sectional view on line 4—4 of Figure 2.

Figure 5 is a sectional view on line 5—5 of Figure 3.

Figure 6 is a sectional view on line 6—6 of Figure 4.

Figure 7 is a view similar to Figure 6, showing the sleeve in a position to discharge slugs.

Figure 10 is a detail view of the sleeve actuating lever.

Figure 12 is a sectional view on line 12—12 of Figure 1.

Figure 13 is a similar view, showing the parts in position previous to the application of the nut upon the die.

Figure 14 is a similar view, the parts being shown in the position assumed just before the nut is thrust upon the die, the dotted lines indicating the final position.

Figure 15 is a sectional view on line 15—15 of Figure 14.

Figure 16 is a detail side elevation of the nut turning mechanism.

Figure 17 is a sectional view on line 17—17 of Figure 16.

Figure 18 is a sectional view on line 18—18 of Figure 17.

Figure 19 is a detail plan view of the cams.

Figure 20 is a top plan view of the nut turning fingers showing the initial position of the nut.

Figure 21 is a similar view, showing the position of the nuts after the fingers have been moved forwardly.

Figure 22 is a similar view, the fingers having been moved to a position to completely turn the nut.

Figure 23 is a similar view, the fingers being shown in the positions assumed to push the nut into the chute.

Figure 24 is a sectional view on line 24—24 of Figure 16.

Figure 1:
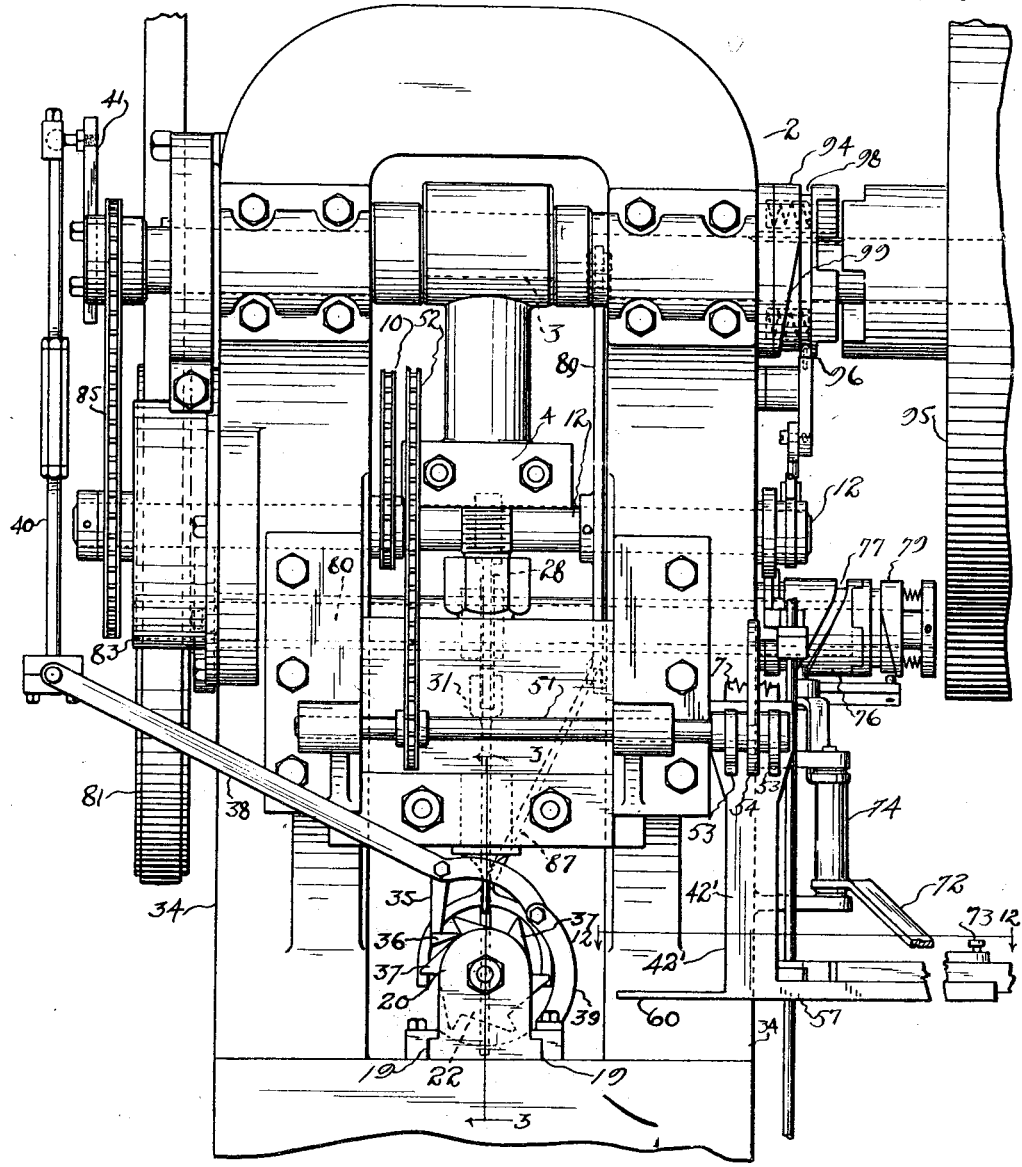
Figure 1 is a front view of the device, the nut hopper removed.
Figure 8:
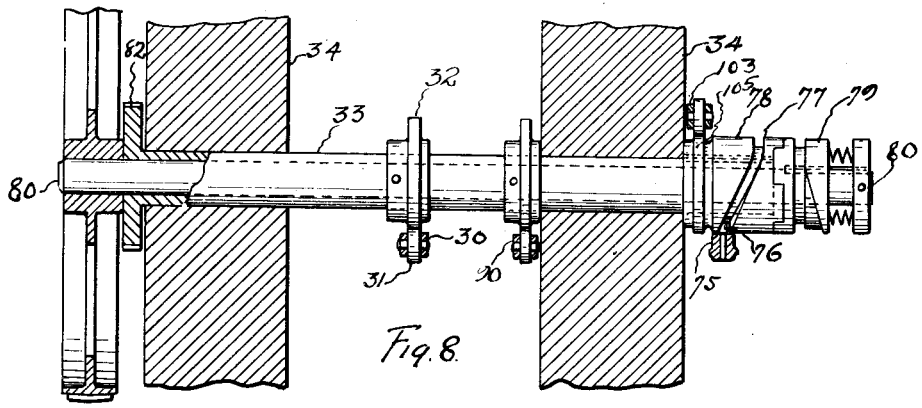
Figure 8 is a sectional view on line 8—8 of Figure 2.
Figure 9:
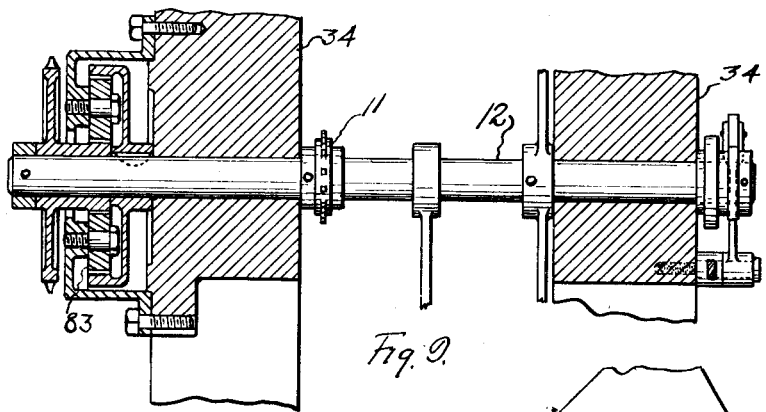
Figure 9 is a sectional view on line 9—9 of Figure 2.
Figure 11:
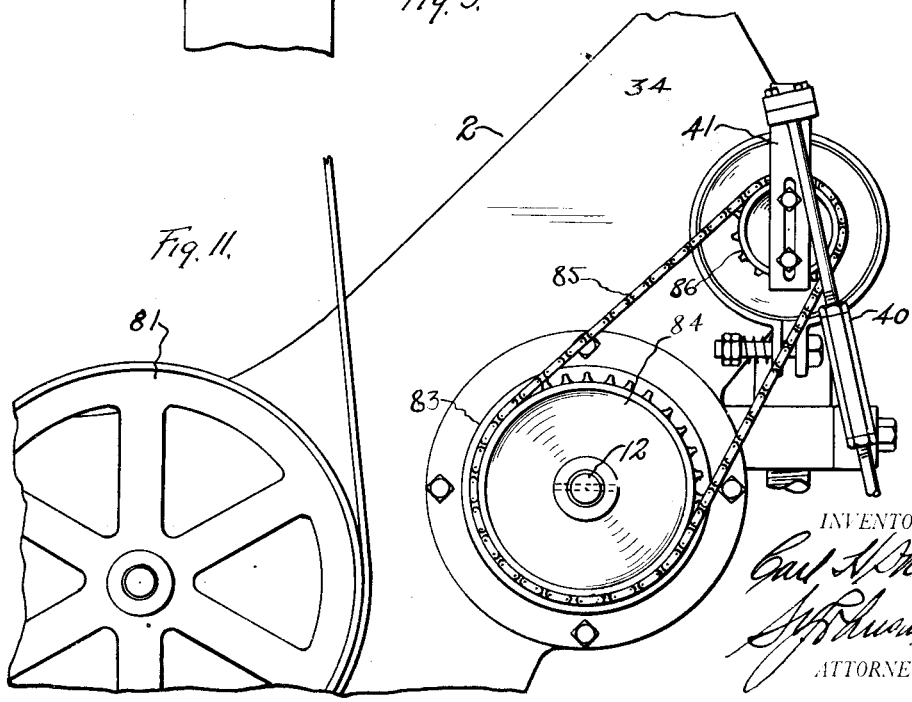
Figure 11 is a fragmentary side elevation.

Referring to the drawings 1 designates the base of a punch press having mounted thereon the frame 2, and upon which is supported the crank shaft 3 for reciprocating the ram 4 carrying the punch 5, as is customary. Suitably supported upon the frame 2 is a nut carrying hopper 6 and associated therewith is a chute 7 for receiving the nuts as they are fed from the hopper by the blades 8 carried by the shaft 9, rotary movement being imparted to said shaft through the medium of the sprocket chain 10 trained around the sprocket 11 on the shaft 12.

It will be obvious that the crowns 13 of the nuts 14, after leaving the hopper and entering the chute 7 will not all be properly positioned for action upon by the punch 5 and means have been provided for overcoming this condition so that the crowns 13 will be automatically placed in their correct positions upon the die 16, said die being carried by a bar 17 suitably supported on the base 1. Slidably mounted on this bar is a sleeve 18, the purpose of which will appear later. Slidable in guides 19 upon the base is a casing 20 in which is mounted a spring pressed plunger 21, there being keyed upon said plunger a ratchet wheel 22 which is rotatable in a slot 23 in the casing and serving to intermittently rotate the plunger. The plunger has carried by its inner end a collet 24 in which is formed a seat 25 for holding the nuts, there being located in said collet a plurality of spring pressed fingers 26 which serve to dislodge the nuts from the seat after the crowns have been castellated or punched.

In order to slide the casing 20 outwardly a sufficient distance to permit the nuts to be placed upon the die 16, as shown in Figure 3 of the drawings, a rod 27 is employed, said rod being pushed outwardly by the lever 28 which has its upper end pivotally connected to the shaft 12 and its lower end engaged with the rod 27, there being a coil spring 29 to return the casing to its normal position. This lever has an angularly disposed arm 30 which is provided upon its outer end with a roller 31 adapted to engage the cam 32 fixed to the tubular shaft 33, which is supported by the sides 34 of the frame 2.

In castellating the crowns 13 it is necessary that six slots be made therein, therefore the plunger 21 is intermittently rotated through the medium of the wheel 22 in order that the crowns are each subjected to the punching action of the punch 5 at six points and in order to accomplish this a pawl 35 is employed and is provided with a comparatively long tooth 36 for engagement with the teeth 37 of the wheel. By providing the long tooth 36 engagement with the teeth 37 is assured when the casing 20 is slid in either direction. This pawl is pivotally supported by the lever 38, said lever having its lower end pivotally connected to the bracket 39 mounted upon one of the guides 19. To impart swinging movement to the lever 38 the upper end thereof is pivotally connected with the lower end of the sectionalized rod 40, the upper end of which is pivotally connected to the block 41 adjustably connected to the adjacent end of the crank shaft 3. In this manner the tooth 36 successively engages the teeth 37, thus rotating the plunger 21 and collet 24, whereupon the crowns 13 are rotated a sixth of a revolution in order that the punch 5 punches at six points, the movement of the ratchet wheel 22 being so timed as to accomplish this.

The mechanism for turning the nuts in order that the crowns 13 thereof will be correctly placed upon the die comprises a housing 42, and in which opens the lower end of the chute 7, there being a magazine 42' having its upper end communicating with the inner end of said housing. This housing has associated therewith upper and lower sets of balls 43, each set comprising a pair, which are disposed between the adjacent end of the chute 7 and magazine 42', whereby the nuts are turned after leaving the chute and before they enter the magazine to positively place the crowns 13 in the position as shown in Figure 6 of the drawing.

The housing 42 is provided with a table 44 upon which is slidably mounted three push bars 45 and 46, the central bar 46 having a comparatively narrow finger 47 and has a greater throw than the fingers 48 of the respective bars 45. Each of the bars have associated therewith rods 49 upon which are mounted coil springs 50, which serve to return the bars and fingers to their normal positions after the nut turning operation. Supported upon the sides 24 is a shaft 51 driven by a sprocket chain 52 from the shaft 9, said shaft having cams 53 and 54 fixed thereto, the latter being disposed between the former, there being anti-friction rollers 55 upon the ends of the respective bars 45 and 46 for engagement with the cams.

In Figure 20 of the drawings a nut 14, shown in dotted lines, is positioned in the housing 42 and at which time fingers 47 and 48 are engaged therewith, the cams being in the position as shown in Figure 16. The shapes of the cams are such that rotation thereof in the direction of the arrow will first move the fingers 47 and 48 simultaneously forward, thus placing the nut in the position as shown in Figure 21, and at which time the nut is engaged between certain of the balls 43, which form, in effect, a pivot to permit turning of the nut. Further movement of the cams causes cam 54 to move the finger 47 to the position as shown in Figure 22, thus turning the nut so that the crown thereof will be properly positioned for engagement with the die 16. Still further movement of the cams causes the fingers 48, as well as the finger 47 to move further forward, as shown in Figure 23, thereby pushing the nut into the upper end of the magazine 42', after which it falls into its correct position for engagement with the die. As the cams rotate the springs 50 will be compressed and serve to return the bars to the positions as shown in Figure 21, for operation in connection with the succeeding nuts. As shown in Figure 17, the nut is engaged between the left hand set of balls 43, and it will be understood that the nuts may pivot upon the other set of balls and when the nut is so positioned the fingers 47 and 48 function in the same manner to turn the same before falling into the magazine.

The lower end of the magazine terminates in a pair of sides 56 engaged with an elongated platform 57 having a longitudinal groove 58 in which is slidable a bar 59, said platform having an extension 60 which is disposed at right angles to the die 16 in order that the nuts will be properly positioned with respect to said die as they are successively moved from the magazine 42'.

Pivotally connected to the bar 59, as at 61, is an arm 62, the pivotal connection having a spring 63 associated therewith. Pivotally mounted in the arm 62 is a block 64 having formed integral with one side, a finger 65, the opposite side having an integral lug 66. A leaf spring 67 is secured intermediate its ends to one side of the arm 62 and has a resilient extension 68 which engages the lug 66, and serves to swing the block 64 to the right at certain intervals, the purpose of which will later appear. The arm 62 is provided with a seat 69 for the nuts 14, there being a plate 70 carried thereby to prevent the nuts from dropping from between the finger 65 and spring 67 after the arm leaves the extension 68 for placing the nuts in positions to be thrust upon the die 16 for punching the crowns thereof, said spring being slotted, as at 71 to permit passage of the die into the opening of the nuts.

It is necessary that the bar 59 be reciprocated and to accomplish this a lever 72 is provided and has one end pivotally and slidably connected to the stud 93 carried by said bar, the other end of the lever being pivotally supported upon the frame 2 by a sleeve 74. This sleeve and thus the lever 72 is rocked by the angle arm 75 which has a stud 76 engaged in the groove 77 of the clutch head 78 slidable on the tubular shaft 33, the inclination of said groove being such as to reciprocate the bar at the desired speed to position the nuts for successive engagement with the die 16. A slidable spring pressed clutch head 79 is mounted on the shaft 80 upon which the tubular shaft 33 is mounted and it is through the shaft 80 that the shaft 33 is rotated when the clutch heads 78 and 79 are in engagement, the shaft 80 being driven by the belt pulley 81 from any suitable source of power, there being a brake drum 82 carried by one end of the shaft 33.

Associated with the shaft 12 is a planetary gear structure 83 and to drive the same a sprocket 84 is secured to said shaft, there being a sprocket chain 85 trained around said sprocket and driven from the sprocket 86 fixed to the crank shaft 3. During rotation of the shaft 3 the sprocket chain 10 will transmit movement to the shaft 9, said shaft imparting movement to the shaft 51 carrying the cams 53 and 54.

To reciprocate the sleeve 18 in order to remove the slugs cut by the punch 5, a lever 87 is provided and has its lower end connected with the sleeve, the upper end thereof being merged with a bearing 88 pivotally supported on the shaft 12. This bearing has levers 89 and 90 integrally connected thereto, the former being engaged with a cam 91 carried by the shaft 3, while the latter is engaged with a cam 92 upon the shaft 80. The die 16 is provided with a slot 93 to permit passage of the punch 5 during the castellating operation, and at which the time die is in the position as shown in Figure 6. The slugs cut will lie in the crown of the nuts until the sleeve has been moved to the position as shown in Figure 7, through the medium of the lever 87, the movement of which is timed by the cam 91 to slide said sleeve upon each sixth revolution, the revolution thereof being controlled by the wheel 22 and pawl 35. As shown in Figure 7, the sleeve has pushed the nut 14 and collet 24 as well as the plunger 21 inwardly, consequently moving the nut crown to a position to permit the slug to fall therefrom. After the punch has formed six slots in the nut crown, the lever 28 moves the rod 27 to slide the casing 20 outwardly a sufficient distance to permit the fingers 26 to force the nut from the seat 25, after which the next nut is applied by the arm 62. The lever 90 is rocked by the cam 92 only after the lever 87 has been rocked six times in order to move the sleeve to force the nuts from the die 16.

To stop the shaft 3 after the punch has operated six times in order to permit a nut to be removed and another replaced upon the die 16, a spring pressed clutch head 94 is slidable on the shaft and when interlocked with the power wheel 95, the ram 4 and thus the punch 5 is compelled to operate. The movement of the clutch head 94 is controlled by an arm 96 having a pin 97 for engagement in the groove 98 of said head, the groove having a beveled wall 99 so that the pin 97 after riding from the groove upon said wall permits the head to slide outwardly to interlock with the hub of the wheel 95. The arm 96 is carried by an arm 100 which is pivotally supported upon the adjacent side 34 and has pivotally connected thereto a rod 101 which has a block 102 thereon and upon which the lever 103 rests, said lever being pivotally mounted on a stub shaft 104. The lever 103 is rocked by the cam 105 upon the tubular shaft 33.

What is claimed is:—

1. The combination with a punch press, of a casing having a plunger therein and provided with a collet, a die for holding nuts alined with the collet, means for rotating the plunger and collet to turn a nut upon the die, whereby the nut will be subjected to successive punching action of the press punch, and means for sliding the casing after the punching operation to remove the slug from the nut.

2. The combination with a punch press, of a die, a sleeve associated with the die, a casing slidable upon the press, a collet slidably mounted in the casing for engaging a nut to hold the same upon the die, means for rotating the collet to turn the nut upon the die, and means for sliding the sleeve outwardly to move the nut and collet to a position to permit slugs cut in the nut to be removed therefrom.

3. The combination with a punch press, of a die, a nut receiving chute, a housing communicating with the chute, push bars slidable in the housing for turning the nuts in uniform positions in the housing, a magazine for receiving the nuts from the housing after the turning operation, and means for thrusting the nuts upon the die after leaving the magazine.

4. The combination with a punch press, of a die, a nut receiving chute, push bars associated with the chute, a housing communicating with the chute for receiving nuts therefrom, upper and lower pairs of balls mounted in the housing, means for operating the bars to push the nuts from the chute between the balls for turning the same, a magazine for receiving the nuts after being turned, and means for thrusting the nuts upon the die after leaving the magazine.

5. The combination with a punch press, of a die, a chute for receiving nuts, a housing, a plurality of push bars movable in the housing, means in the housing for pivotally sustaining nuts therein, said push bars being adapted to turn the nuts on the sustaining means, a magazine for receiving the nuts from the housing after being turned in uniform positions, and means for thrusting the nuts upon the die after leaving the magazine.

In testimony whereof I affix my signature.

CARL H. SHROPE.